(12) United States Patent
Popp

(10) Patent No.: US 7,400,742 B2
(45) Date of Patent: *Jul. 15, 2008

(54) ANIMAL IDENTIFICATION AND SECURITY SYSTEM

(76) Inventor: Joseph B. Popp, 1133 Lincoln St., Hobart, IN (US) 46342-6039

( * ) Notice: Subject to any disclaimer, the term of this patent is extended or adjusted under 35 U.S.C. 154(b) by 849 days.

This patent is subject to a terminal disclaimer.

(21) Appl. No.: 10/777,302

(22) Filed: Feb. 12, 2004

(65) Prior Publication Data
US 2005/0180601 A1  Aug. 18, 2005

(51) Int. Cl.
G06K 9/00 (2006.01)
G06K 5/00 (2006.01)
F06F 17/00 (2006.01)

(52) U.S. Cl. .................. 382/100; 235/380; 235/375; 340/573.1

(58) Field of Classification Search .......... 382/103, 382/100; 340/573.3, 5.8, 375.1; 235/380, 235/375
See application file for complete search history.

(56) References Cited

U.S. PATENT DOCUMENTS 4,617,876 A * 10/1986 Hayes .................. 119/842
5,803,906 A * 9/1998 Pratt et al. ............... 600/300
6,172,609 B1 * 1/2001 Lu et al. ................ 340/572.4
6,211,789 B1 * 4/2001 Oldham et al. ........... 340/573.3
6,259,367 B1 * 7/2001 Klein .................... 340/572.1
6,533,172 B1 * 3/2003 Popp ....................... 235/380
6,664,897 B2 * 12/2003 Pape et al. ............... 340/573.3
7,259,680 B2 * 8/2007 Popp ..................... 340/573.1

* cited by examiner

Primary Examiner—Andrew W. Johns
Assistant Examiner—Andrae S Allison
(74) Attorney, Agent, or Firm—Wildman Harrold Allen & Dixon LLP

(57) ABSTRACT

An animal identification and security system and method assigns an identifying code uniquely associated with each system member and each animal owned by the member. An identification code imprinted on a marker attached to the animal includes information uniquely identifying the animal's owner including a two letter abbreviation of the state of residence, a numerical identifier of the county of residence, and an assigned number designating the owner's ranch/farm within the indicated county. The identification code further includes a letter designation of the type of animal and the individual animal's number within the owner's herd/flock, as well as a two letter designation of the animal's country of origin. The identifying codes are maintained in a computerized system at a central location for dissemination on a global information network for facilitating the return of lost or stolen animals to the rightful owner and to indicate the origin of all registered animals.

24 Claims, 3 Drawing Sheets

ANIMAL IDENTIFICATION AND SECURITY SYSTEM

FIELD OF THE INVENTION

This invention relates generally to identification of and security for animals such as used in commercial businesses and is particularly directed to a system and method for assigning and recording an individual owner-animal identifying code for each system member as well as for each animal owned by each member. Each animal is permanently marked with this code which also identifies the type of animal and the country of origin of the animal. All of the owner-animal codes are stored in a computerized system connected to a global information network for worldwide dissemination of this information to facilitate the return of lost/stolen animals to their rightful owner and the tracking of individual animals for public health and safety reasons.

BACKGROUND OF THE INVENTION

A need exists for identifying and tracking domesticated animals such as used in commercial businesses such as those involving dairy and beef cattle, sheep, hogs, horses, goats, llamas, birds, etc. Marking personal property such as tools and machines essential to the operation of a business is common. However, there is currently no available system for identifying which animals belong to a particular owner and the location of that owner. This information would be helpful in the recovery of lost or stolen animals to return the missing animals to their rightful owner, as well as for identifying the owner or source of animals having a dangerous disease which may threaten humans or other animals. The need for this type of system as a high priority became clear with the recent "mad cow" disease threat in the beef industry. Information as to the source and history of a diseased animal could be vitally important in locating and identifying the origin of a dangerous and possibly economically devastating animal disease, as well as for limiting exposure of humans and other animals which might be potentially affected by the disease. This important information is currently not available to any government or regulatory body for use in preventing or combating a dangerous animal epidemic. In addition, a centralized animal identification and security system would facilitate the return of lost/stolen animals to their rightful owner as well as the transfer of ownership of animals by using a single database which is easily updated and universally accessible to provide realtime animal ownership information.

The present invention addresses the aforementioned limitations of the prior art by providing an animal identification and security system and method which assigns an identifying code uniquely associated with each animal owner member as well as each individual animal owned by the member. This identification and security system and method is particularly adapted for use with commercial animals used in the conduct of a business such as cattle, hogs, sheep, horses, etc. The animal identification and security system provides for the centralized recording and storage of ownership information relating to animals as well as to the permanent marking of ownership indicia on each animal. Ownership indicia includes information relating to the state and county of residence or location of the animal owner and the owner's ranch or farm, as well as the particular type of animal, the specific animal in each owner's herd/flock, and the country of origin of each animal.

OBJECTS AND SUMMARY OF THE INVENTION

Accordingly, it is an object of the present invention to provide a system and method for marking animals in a manner which uniquely identifies the animal's owner and location.

It is another object of the present invention to mark animals such as used in commercial businesses in a manner which uniquely identifies the animal's owner using a marking code which identifies the state and county of residence or location of the owner, as well as the owner's ranch or farm within the designated county.

Yet another object of the present invention is to provide an animal marking code uniquely identifying the animal's owner as well as the owner's state and county of residence or location and the type of animal, which indicia is recorded and stored in a central location and is available on a global information network.

A still further object of the present invention is to provide an international registration and recording system for commercial-type animals which uniquely identifies the owner and location of the animal as well as the type of animal and its country of origin and makes this information available on a global information network.

The present invention contemplates a system and method for identifying an animal and the owner of the animal. The system makes use of first coded indicia comprising a first portion identifying a state of residence or location of the owner; a second portion identifying a county of residence or location of the owner; and a third portion uniquely identifying a farm or ranch on which the owner resides or is located within the owner's county. The system further employs second coded indicia uniquely identifying the animal, which comprises a fourth portion identifying the type of animal; a fifth portion identifying the individual animal within the owner's herd or flock by number; and a sixth portion identifying the country of origin of the animal. The invention also includes a marker, or tag, containing the first and second coded indicia permanently attached to the animal; a memory storing the first and second coded indicia in a central location for future reference; and a global information network coupled to the memory for making the first and second coded indicia available on a worldwide basis.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
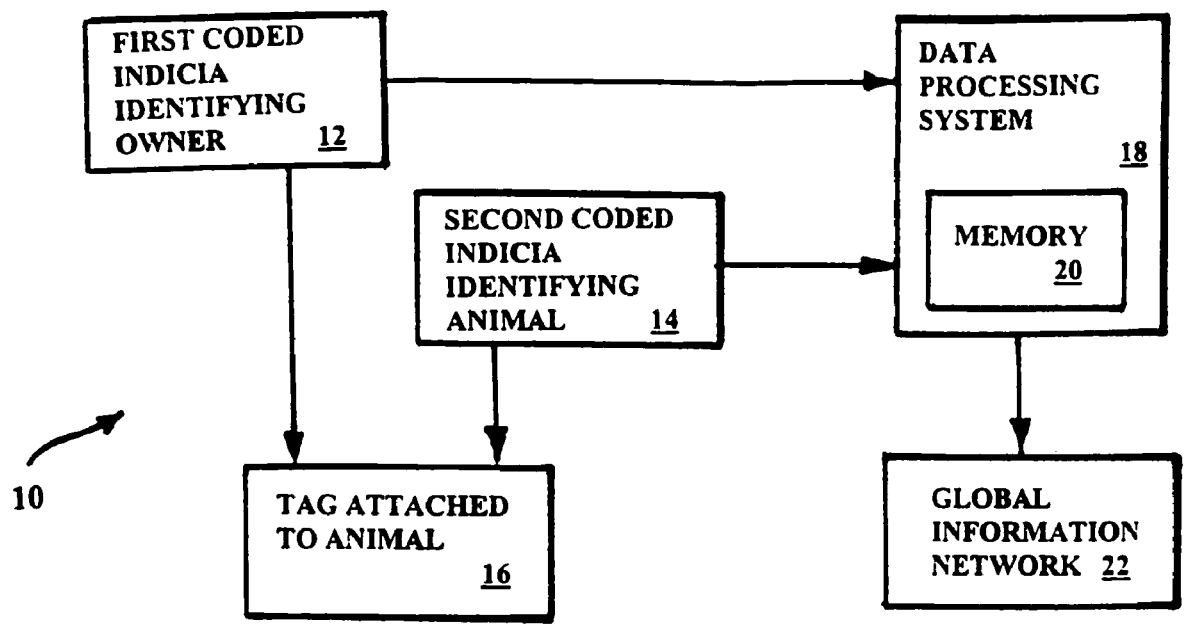
FIG. 1 is a simplified block diagram of an animal identification and security system in accordance with the principles of the present invention.

Referring to FIG. 1, there is shown a simplified block diagram of an animal identification and security system 10 in accordance with the principles of the present invention.

The animal identification and security system 10 makes use of first coded indicia 12 identifying the owner of an animal to be registered in the system. The format and content of this first coded indicia 12 is described in detail below. The first coded indicia 12 associated with a respective animal owner is affixed to a tag or marker 16 for permanent attachment to the animal. Marker 16 may take on various forms, with a preferred embodiment for the marker described in detail below. The animal identification and security system 10 also makes use of second coded indicia 14 which uniquely identifies each animal. The second coded indicia 14 is also clearly and permanently affixed to the marker 16 for attachment to the animal.

The first coded indicia 12 and second coded indicia 14 are also input to a data processing system 18. Date processing system 18 includes, among other things, a memory 20 for storing the first and second coded indicia 12, 14 for the animals of each registered animal owner. Data processing system 18 may be conventional in design and operation and is preferably disposed at its central location. Memory 20 in which animal owner identification as well as coded indicia associated with each individual animal is stored is also of conventional design and operation. Memory 20 could typically be in the form of a random access memory (RAM) which allows for the entry and update of animal ownership data stored in the memory. Data processing system 18 is connected to a global information network 22, such as the Internet, to allow for universal accessing of the animal ownership and identification information in the form of the first and second coded indicia 12, 14 stored in the data processing system's memory 20. This permits individuals as well as various organizations, such as regulatory agencies and healthcare organizations, around the world to check the animal owner and animal identification coded indicia stored in the data processing system's memory 20 to determine or verify ownership of a given animal as well as to determine the history of an animal. By storing this information and making it available on a universal basis, animal ownership determination and animal identification can be accomplished faster, more easily and more reliably than heretofore available.

Figure 2:
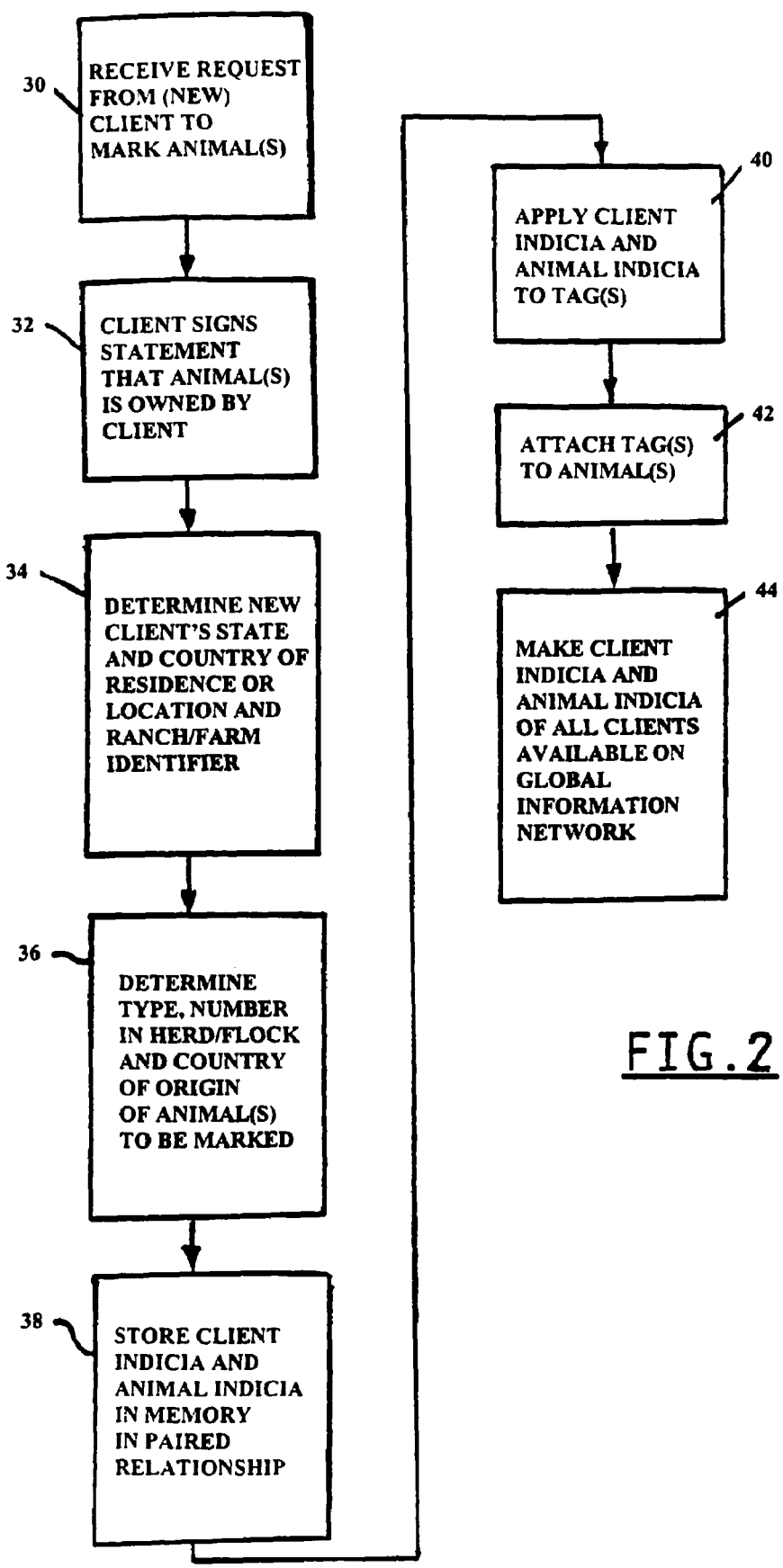
FIG. 2 is a simplified flow chart illustrating the sequence of steps involved in carrying out the animal identification and security system and method of the present invention.

Referring to FIG. 2, there is shown a simplified flow chart illustrating the series of steps involved in carrying out an animal identification and security system and method in accordance with the principles of the present invention. At step 30, a request is received from a new client, or animal owner, to mark an animal with coded indicia for uniquely identifying: the client as the owner of the animal, the residence or location of the animal's owner, the type and identity of the specific animal being marked, and the origin of the animal. The request received in step 30 may also come from an animal owner already registered in the system who would like to register additional animals in the system. The first coded indicia 12 is comprised of a combination of alphanumeric characters identifying the state and county of residence or location of the owner. For example, the first two characters of the first coded indicia 12 are comprised of a two letter abbreviation of the state in which the owner resides or is located. More specifically, the first two characters of the first coded indicia 12 for an Indiana resident are "IN", while the first two characters for an Illinois resident are "IL". The next two characters in the first coded indicia 12 are in the form of a number representing the county of residence or location of the owner within a given state. All states make use of a numerical system for designating each county within that state. An example of a numerical listing employed by the state of Indiana for counties in that state is shown in Table I. For example, the first four characters in the first coded indicia 12 for a resident of Porter County in Indiana would be "IN64". Finally, a last set of characters in the first coded indicia 12 identifies the ranch or farm of the owner within the designated state and county. A "slash" separates the county designation number and the ranch or farm designation number. As each new owner is registered, a number is assigned to that owner's ranch or farm. Thus, coded indicia for a new owner residing in Porter County, Ind. might be represented as "IN64/201", where the number 201 indicates that the client resides or is located on ranch or farm number 201 within Porter County, Ind.

TABLE I

1. Adams
2. Allen
3. Bartholomew
4. Benton
5. Blackford
6. Boone
7. Brown
8. Carroll
9. Cass
10. Clark
11. Clay
12. Clinton
13. Crawford
14. Daviess
15. Dearborn
16. Decatur
17. Dekalb
18. Delaware
19. Dubois
20. Elkhart
21. Fayette
22. Floyd
23. Fountain
24. Franklin
25. Fulton
26. Gibson
27. Grant
28. Greene
29. Hamilton
30. Hancock
31. Harrison
32. Hendricks
33. Henry
34. Howard
35. Huntington
36. Jackson
37. Jasper
38. Jay
39. Jefferson
40. Jennings
41. Johnson
42. Knox
43. Kosciusko
44. LaGrange
45. Lake
46. Laporte TABLE I-continued 47. Lawrence
48. Madison
49. Marion
50. Marshall
51. Martin
52. Miami
53. Monroe
54. Montgomery
55. Morgan
56. Newton
57. Noble
58. Ohio
59. Orange
60. Owen
61. Parke
62. Perry
63. Pike
64. Porter
65. Posey
66. Pulaski
67. Putnam
68. Randolph
69. Ripley
70. Rush
71. St. Joseph
72. Scott
73. Shelby
74. Spencer
75. Starke
76. Steuben
77. Sullivan
78. Switzerland
79. Tippecanoe
80. Tipton
81. Union
82. Vanderburgh
83. Vermillion
84. Vigo
85. Wabash
86. Warren
87. Warrick
88. Washington
89. Wayne
90. Wells
91. White
92. Whitely The second coded indicia 14 is also comprised of a combination of alphanumeric characters, with these latter alphanumeric characters identifying the type, or species, of the animal, the specific number of the animal within the owner's herd or flock, and the country of origin of the animal. Thus, the second coded indicia 14 may take the form of "BD175CA", where "BD" designates a bovine dairy animal, or cow, "175" designates the 175th animal in the owner's herd or flock, and "CA" designates Canada as the country of origin of the animal. Table II is a partial alphabetic listing of letters representing various types of animals contemplated for use in the animal identification and security system of the present invention. Similarly, Table III is a partial listing of country codes which could be used for identifying the country of origin of the animal. While the present invention is disclosed primarily for use with animals used in commercial businesses such as in agriculture, the inventive animal identification and security system may be used in identifying and tracking virtually any type of animal owned by man.

TABLE II

| LETTER DESIGNATION | ANIMAL |
| --- | --- |
| A | Alpacas |
| BB | Bovine Beef (Cattle) |
| BD | Bovine Dairy (Cows) |
| C | |
| D | Donkeys |
| E | Equine |
| F | |
| G | Geese |
| H | Hogs |
| I | |
| J | |
| K | |
| L | Llamas |
| M | |
| N | |
| O | Ostriches |
| P | Poultry |
| Q | |
| R | Rabbits |
| S | Sheep |
| T | Turkeys |
| U | |
| V | Vicunas |
| W | |
| X | |
| Y | Yaks |
| Z | Zebras |

TABLE III

| COUNTRY | ABBREVIATION |
| --- | --- |
| Australia | AU |
| Austria | AT |
| Belgium | BE |
| Brazil | BR |
| Canada | CA |
| China | CN |
| Colombia | CO |
| Costa Rica | CR |
| Czech Republic | CZ |
| Denmark | DK |
| Finland | FI |
| France | FR |
| Germany | DE |
| Granada | GD |
| Greece | GR |
| Hungary | HU |
| Indonesia | ID |
| Ireland | IE |
| Israel | IL |
| Japan | JP |
| Korea, Republic of | KR |
| Mexico | MX |
| Netherlands | NL |
| New Zealand | NZ |
| Russian Federation | RU |
| South Africa | ZA |
| Spain | ES |
| Sweden | SE |
| Switzerland | CH |
| Turkey | TR |
| Ukraine | UA |
| United Kingdom | GB |

After a request is received from a new or existing client at step 30, the next step 32 involves a client signing a statement to the effect that the animal, or animals, to be registered and marked is the property of the client. This statement would preferably be in the form of an affidavit made under oath before a notary public or other person of authority. The next step 34 in the inventive process is to determine the client's state and county of residence or location and the client's ranch/farm identifying number. The client's state and county of residence or location is assigned an alphanumeric code as described above, while the client's ranch/farm may be assigned a numerical identifier in accordance with the order in which the client registers in the animal identification and security system. After the client's state and county of residence or location is determined as well as the client's ranch/farm identifier at step 34 the type, number in the owner's herd/flock, and country of origin of the animal to be marked is determined at step 36. The client indicia (first coded indicia) and the animal indicia (second coded indicia) are then stored in memory in a paired relationship for uniquely identifying the owner as well as the animal being marked at step 38. At step 40, the client indicia and animal indicia are permanently applied to the marker to be attached to the animal. The marker is then attached to the animal at step 42 as described below and the client indicia and animal indicia assigned to that specific animal are made available on a global information network for worldwide dissemination at step 44.

Figure 3:
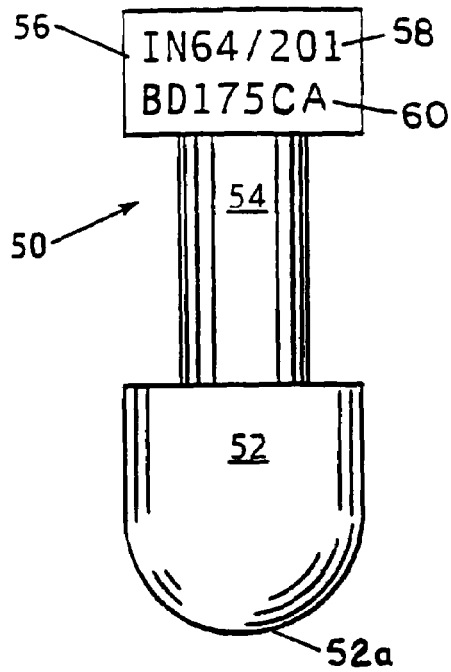
FIG. 3 is a side elevation view of a marker, or tag, containing indicia uniquely identifying an animal and the animal's owner which is adapted for permanent attachment to or implantation in an animal in accordance with one embodiment of the present invention.
Figure 4:
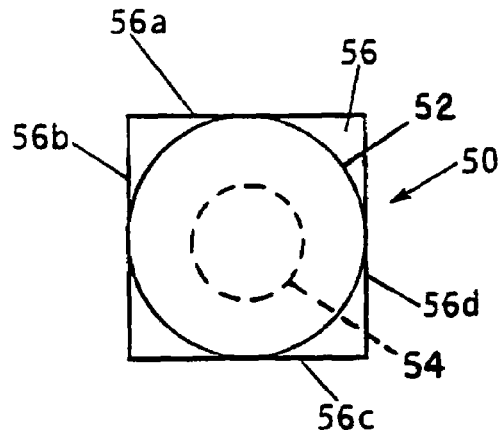
FIG. 4 is an end-on view of the animal marker shown in FIG. 3.
Figure 5:
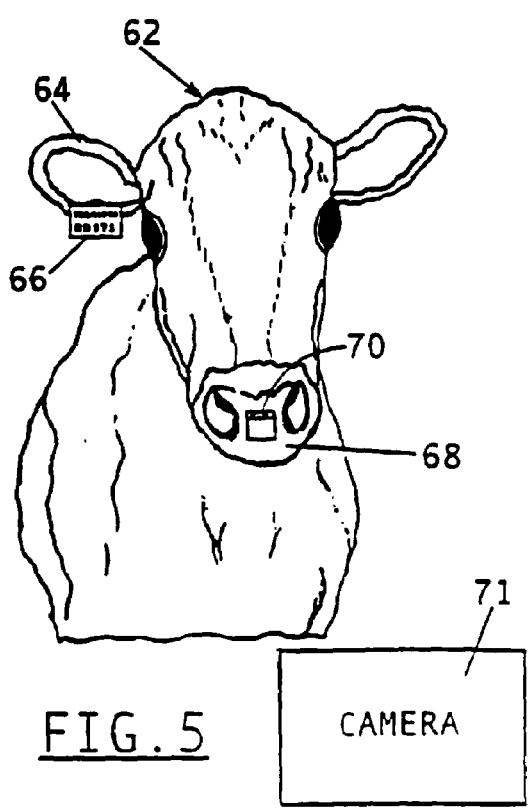
FIG. 5 illustrates two different markers containing animal and animal owner indicia attached to a cow in accordance with different embodiments of the present invention.

Referring to FIG. 3, there is shown a side elevation view of one embodiment of a marker, or tag, 50 for use in the animal identification and security system of the present invention. An end-on view of the marker 50 is shown in FIG. 4. Marker 50 is preferably comprised of a high strength, lightweight material such as plastic and is on the order of ⅝" long and ¼" wide at its maximum width. Marker 50 is preferably white and unitary in structure and includes a semi-spherical end member 52 having a semi-spherical distal end 52a, a rectangular member 56 disposed on a second, opposed end, and a cylindrical shaft 54 connecting the cylindrical end and the rectangular end. In a preferred embodiment, the semi-spherical end member 52 is ¼" in length and ¼" in diameter; the cylindrical shaft 54 is ⅛" in diameter and ¼" long; and the rectangular member 56 is ¼" on each lateral side and ⅛" thick. Disposed on each of the four (4) lateral faces of the rectangular member 52 is a first indicia line 58 and a second indicia line 60. As previously described, the first indicia line contains information uniquely identifying the animal's owner, while the second indicia line 60 contains information uniquely identifying the animal to which the marker 50 is attached. The first and second indicia lines 58 and 60 are permanently placed on the marker 50 by conventional means, such as by molding into the rectangular member 52, but may be changed if ownership of the animal changes. This indicia could be changed by imprinting or affixing new indicia on the marker 50 by any of various well known processes or techniques. A camera 71 is shown in FIG. 5 for photographing the indicia on a marker attached to each animal while the animals are eating or drinking water for making a permanent record of the owner's animals. Over time, the cartilaginous material in the cow's muzzle 68 will overgrow and cover the marker's semi-spherical end member 52 and will be in tight fitting engagement with the marker's cylindrical shaft 54 for permanent attachment of the marker 50 to the animal.

Referring to FIG. 5, there is shown the manner in which a marker 70 in accordance with the present invention is permanently attached to an animal such as a cow 62. The marker 70 shown in FIG. 4 is of the same configuration and size as the marker shown in FIG. 3 and described in detail above. The semi-spherical end of marker 70 is inserted in the muzzle, or snout, 68 of the cow 62 intermediate its nostrils as shown in FIG. 4. Marker 70 is preferably attached to the cow when the cow is a young calf, which allows the cartilaginous material of the cow's muzzle to grow around the spherical end and cylindrical shaft portions of the marker 70 to permanently embed the marker in the cow. The size of the marker's rectangular end is such as to allow the owner and animal indicia disposed thereon to be easily read, with the marker not interfering with the eating, drinking or breathing of the cow. This location of the marker 70 on the cow's muzzle facilitates reading of the indicia on the marker's flat plate end when the cow is eating or drinking water. Marker 70 is inserted in an opening made in the cow's muzzle 68 by a sharp cutting instrument perhaps after administering a local anesthetic to the animal. The cutting instrument may preferably form an "X" shaped incision in the muzzle to facilitate insertion of semi-spherical end member 52 of the marker.

Also shown in FIG. 5 is another embodiment of a marker 66 for permanently affixing animal and animal owner information to an animal in accordance with the present invention. Marker 66 is also comprised of a high strength, rigid or semi-rigid material such as plastic and is permanently affixed to the cow's right ear 64 by conventional means such as staples or wire (not shown for simplicity). The location of marker 66 on cow 62 also facilitates reading of the animal and animal owner indicia on the marker when the cow is eating or drinking water.

Figure 6:
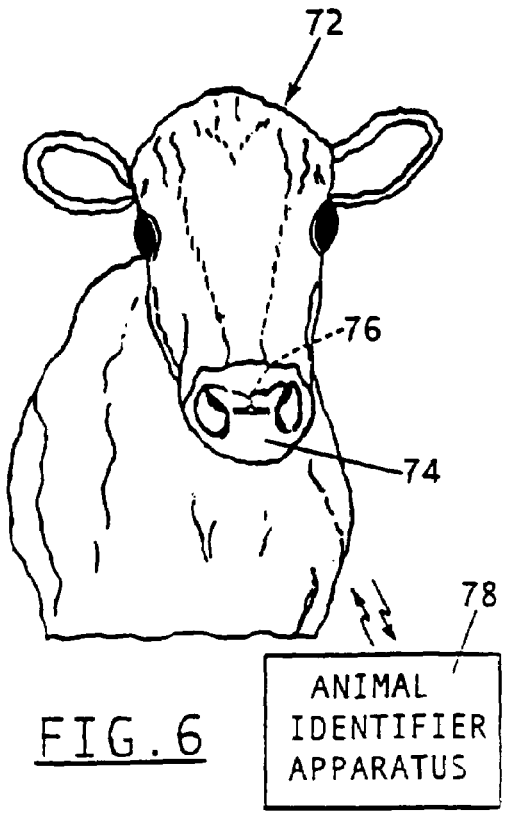
FIG. 6 illustrates another embodiment of a marker containing animal and animal owner indicia implanted in a cow in accordance with the present invention.

Referring to FIG. 6, there is shown another embodiment of a marker 76 (shown in dotted line form) for use with a cow 72. Marker 76 is implanted in the cow's muzzle 74 by means of an incision in the muzzle, which may be closed by conventional means such as stitches or staples. Marker 76 is thus permanently installed in the cow 72. Marker 76 preferably includes an integrated circuit (IC) chip which is responsive to an RF inquiry signal from an animal identifier apparatus 78 which includes a transmitter for directing an RF inquiry signal to the marker 76 and a receiver for receiving a response emitted by the marker. The response provided to the animal identifier apparatus 78 includes the aforementioned animal and animal owner identifier information. By merely scanning the marker 76 with the animal identifier apparatus 78, the animal and the animal owner may be uniquely identified. The animal identifier apparatus 78 may be handheld, or may be mounted to a structure disposed adjacent to where the animals are located or adjacent to a path along which the animals travel. The IC chip marker 76 is preferably re-programmable after being implanted in an animal to accommodate for changes in animal ownership and identification of a new owner.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A system for identifying an animal and the owner of the animal comprising:
   first coded indicia uniquely identifying the owner, said first coded indicia comprising:
      a first portion identifying a state of residence or location of the owner;
      a second portion identifying a county of residence or location of the owner; and
      a third portion uniquely identifying a farm or ranch on which the owner resides or is located within the owner's county;
   second coded indicia uniquely identifying the animal, said second coded indicia comprising:
      a fourth portion identifying the type of animal;

a fifth portion identifying an individual animal within the owner's herd or flock by number; and a sixth portion identifying the country of origin of the animal;

a marker containing said first and second coded indicia permanently attached to the animal;

a memory storing said first and second coded indicia in a central location for future reference; and a global information network coupled to said memory for making said first and second coded indicia available on a worldwide basis.

2. The system of claim 1 wherein the first portion of said first coded indicia is an abbreviation of the state of residence or location of the animal.

3. The system of claim 2 wherein the second portion of said first coded indicia is a number identifying the county of residence or location of the owner.

4. The system of claim 2 wherein the third portion of said first coded indicia is a number uniquely identifying a farm or ranch on which the owner resides or is located within the owner's county.

5. The system of claim 1 wherein the fourth portion of said second coded indicia is at least one alphabet character uniquely identifying the type of animal.

6. The system of claim 5 wherein the fifth portion of said second coded indicia is a number uniquely identifying the animal within the owner's herd or flock.

7. The system of claim 6 wherein the sixth portion of said second coded indicia is a two letter alphabet code identifying the country of origin of the animal.

8. The system of claim 1 wherein said marker is attached to an ear of the animal.

9. The system of claim 1 wherein said marker is irremovably inserted in a muzzle of the animal.

10. The system of claim 1 wherein said marker is implanted under the skin of the animal, and said system includes a scanning device for transmitting a first inquiry signal to said marker and receiving a second animal and animal owner identification signal from said marker.

11. The system of claim 1 wherein said marker is comprised of a generally flat first end portion containing said first and second coded indicia, a semi-spherically-shaped second end portion adapted for insertion in and retention by a muzzle of the animal, and an elongated, linear member having first and second ends respectively coupled to said generally flat first end portion and to said semi-spherically-shaped second end portion.

12. The system of claim 11 wherein said semi-spherically-shaped second end portion includes a semispherically-shaped distal end.

13. The system of claim 12 wherein said elongated, linear member is cylindrically shaped.

14. The system of claim 13 wherein said marker is comprised of high strength plastic.

15. A method for recording ownership and identification information of animals and distributing said ownership and identification information to facilitate recovery of lost or stolen animals by the owner and identification of the animals, said method comprising the steps of:

assigning first coded indicia to an animal owner by providing a first portion of said first coded indicia in accordance with a state of residence or location of the owner, a second portion of said first coded indica in accordance with a country of residence or location of the owner, and a third portion of said first coded indica in accordance with the farm or ranch of the owner within the owner's county;

assigning second coded indicia to an animal of the owner by providing a fourth portion of said second coded indicia identifying the type of animal, a fifth portion of said second coded indicia identifying the individual animal within the owner's herd or flock by number, and a third portion of said second coded indica identifying the country of origin of the animal;

affixing said first and second coded indicia to the animal;

storing plural paired first and second coded indicia for plural animals in a memory at a central location, wherein each of said paired first and second coded indicia uniquely identifies each of said animal owners and each of said animals; and providing said plural paired first and second coded indicia on a global information network for making said plural paired first and second coded indicia available on a worldwide basis.

16. The method of claim 15 wherein the step of providing a first portion of said first coded indicia includes assigning a two letter abbreviation for the state of residence or location of the animal owner.

17. The method of claim 16 wherein the step of providing a second portion of said first coded indicia includes assigning a number identifying a county of residence or location of the owner.

18. The method of claim 17 wherein the step of providing a third portion of said first coded indicia includes assigning a number to the farm or ranch of the owner for uniquely identifying the farm or ranch on which the owner resides or is located within the owner's county.

19. The method of claim 15 wherein the step of providing a fourth portion of said second coded indicia includes assigning at least one alphabet character for uniquely identifying the type of animal.

20. The method of claim 19 wherein the step of providing a fifth portion of said second coded indicia includes assigning a number for identifying an individual animal within the owner's herd or flock.

21. The method of claim 20 wherein the step of providing a sixth portion of said second coded indicia includes assigning a two letter alphabet code for identifying the country of origin of the animal.

22. The method of claim 15 wherein the step of affixing said first and second coded indicia to the animal includes attaching a marker containing said indicia to an ear of the animal.

23. The method of claim 15 wherein the step of affixing said first and second coded indicia to the animal includes irremovably inserted a marker containing said indicia in a muzzle of the animal.

24. The method of claim 15 wherein the step of affixing said first and second coded indicia to the animal includes implanting a marker containing said indicia under the skin of the animal, and scanning said marker with a first inquiry signal and receiving a second animal and animal owner identification signal from said marker.

* * * * *